United States Patent Office 3,541,689
Patented Nov. 24, 1970

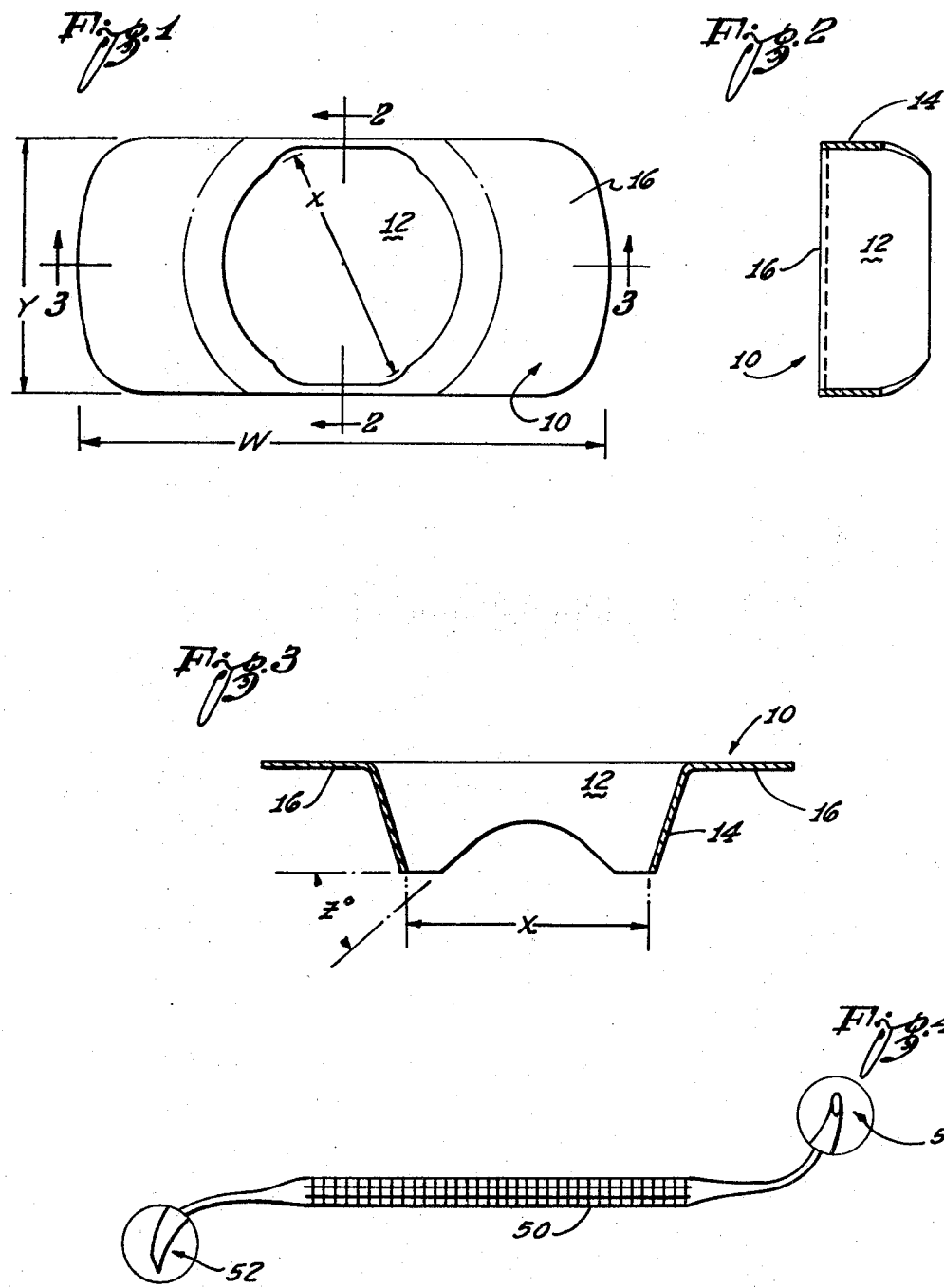

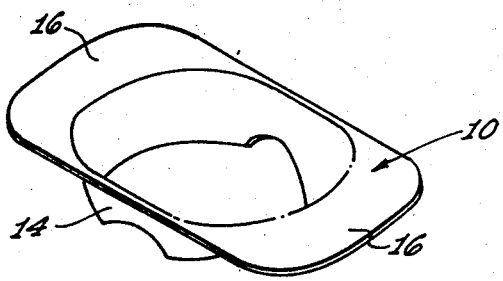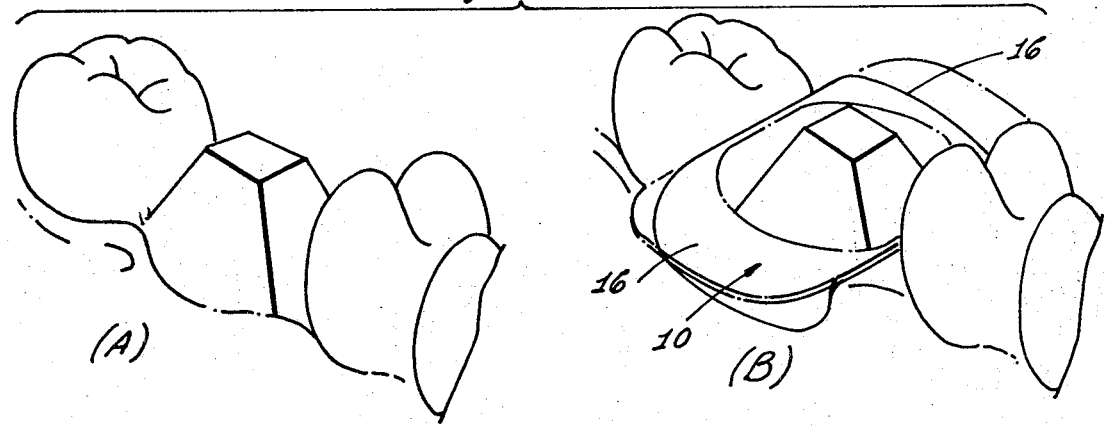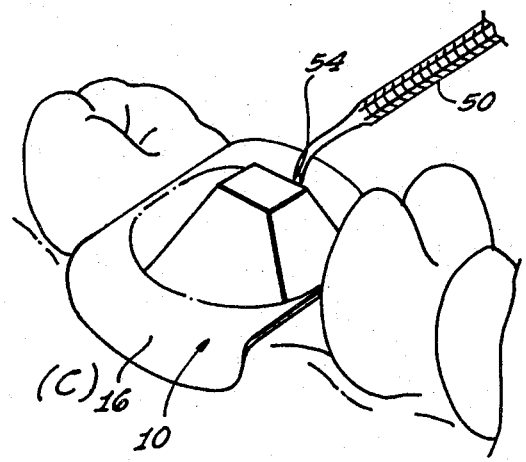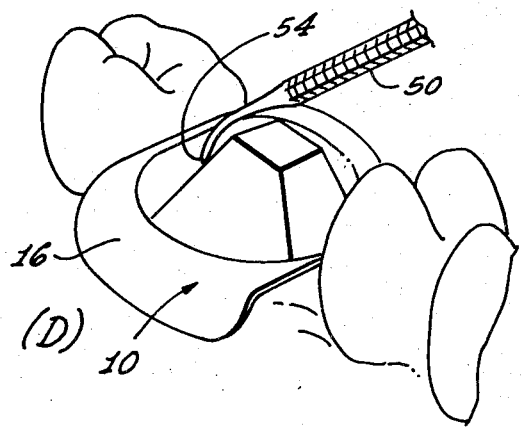

3,541,689
GINGIVAL RETRACTION RING
Wilford A. Snead, West Covina, Calif., assignor to Ormco Corporation, Glendora, Calif., a corporation of California
Filed Mar. 13, 1969, Ser. No. 806,941
Int. Cl. A61c 9/00
U.S. Cl. 32—17                                3 Claims

ABSTRACT OF THE DISCLOSURE

A dental appliance is provided in the form of a gingival retraction collar, which is intended to be moved down over a tooth, and which is designed so that its bottom periphery contours the tooth subgingivally when so inserted. The collar of the present inevntion is intended to replace the present day time consuming methods used by dentists for obtaining subgingival impressions for crowns.

BACKGROUND OF THE INVENTION

The demand for a suitable gingival retraction ring, or collar, arises because the dentists must retract the gum tissue from the tooth when making an impression for a crown. The usual means for accomplishing this in the prior art involves using a string soaked, for example, in alum, and which is then drawn around the tooth and down under the free gingivae so as to expose about one to one and one-half millimeters of the tooth subgingivally. The problem with this particular prior art method is that it is time consuming, and in that it is difficult to keep the preparation dry.

Gingival retraction collars or rings, of the general type with which the present invention is concerned, are known to the art. However, the prior art gingival retraction collars have not proven to be completely satisfactory. This is particularly because they have a tendency to interfere with the impression material, so that the material cannot be easily removed after it has set, and attempts to remove the material either tend to remove the collar at the same time, or to produce tearing of the impression.

The gingival retraction collar of the present invention, on the other hand, is configured to have tabs which may be folded down after the collar is in place around the tooth to cause a portion of the collar to retract and engage the tooth, and at the same time to cause a further portion of the collar to move outwardly against the gingival tissue, the net result being that the prepared tooth is dry and open for a good impression. Moreover, the collar is configured, so that the impression can be easily removed without interference by the collar, and without tearing.

After the gingival retraction collar of the invention has been inserted over the tooth and pressed into place, for example, by the fingers of the dentist; a simple two-ended instrument, as will be described, may be used, if necessary, to retract the collar away from the tooth and provide a space for the impression. The instrument has a buccal-lingual wedge at one end for the buccal and lingual retraction of the collar, and a mesio-distal wedge at the other end for the mesial and distal retraction.

BRIEF DESCRIPTION OF THE DRAWINGS

FIG. 1 is a top plan view of a gingival retraction collar constructed in accordance with the concepts of the invention;

FIG. 2 is a section of the collar of FIG. 1, taken substantially along the line 2—2 of FIG. 1;

FIG. 3 is a section of the collar of FIG. 1, taken substantially along the line 3—3 of FIG. 1;

FIG. 4 is an instrument suitable for retracting the collar of the invention after it has been placed on the tooth of a patient;

FIG. 5 is a perspective view of the collar of FIGS. 1–3; and

FIG. 6 is a series of steps illustrating how the collar is fitted over a treated tooth of the patient.

DETAILED DESCRIPTION OF THE ILLUSTRATED EMBODIMENT

The collar 10 shown in FIGS. 1–3, 5, may be formed of any appropriate material, which is preferably readily flexible, and which may be easily contoured to the shape of the tooth. For example, the collar may be formed of aluminum, copper, brass or of any suitable malleable alloy. The collar 10 has a generally rectangular shape, as viewed in plan in FIG. 1. An aperture 12 is provided in the collar, and the tooth is received in the aperture 12. The collar has a tubular boss-like portion 14 which extends down, as shown in FIG. 3, and which surrounds the aperture 12. The ends of the collar 10 on either side of the aperture 12 comprise integral tabs 16. The bottom edge of the boss-like portion 14 of the collar, as shown best in FIG. 3, has an arcuate configuration on its lingual and buccal sides. It will also be observed that the aperture 12 is tapered from a greater diameter at the plane of the tabs 16, to a somewhat reduced diameter at its lower end in FIG. 3.

Various sizes of collars of the type shown in FIGS. 1–3 may be provided, and these, for example, may be dimensioned as follows:

| X, inch | Y, inch | Z, degrees | W, inch |
|---|---|---|---|
| .356 | .372 | 45 | .792 |
| .370 | .386 | 43 | .806 |
| .384 | .400 | 41 | .820 |
| .398 | .414 | 39 | .834 |
| .412 | .428 | 37 | .848 |
| .426 | .442 | 35 | .862 |
| .440 | .456 | 33 | .876 |

As mentioned above, the collar shown in FIGS. 1–3 is inserted down over the tooth with the orientation shown in FIGS. 6B, 6C and 6D. The collar is pressed down by the doctor until the sides of the boss-like portion 14 extend subgingivally to expose about one to one and one-half millimeters of the subgingival portion of the tooth. The tabs 16 extend in the lingual and buccal directions as shown in FIGS. 6B, 6C and 6D. As the tabs are folded down, the tubular boss-like portion retracts at its lower end, and impinges the tissue at its upper end so as to force the gingival crevice to open, so that the prepared tooth is dry, open, and ready for a good impression.

It will be appreciated that no part of the gingival retraction collar 10 of the invention interferes with the impression itself, and the impression may be removed without any tendency for tearing or for interference with the collar.

The aforesaid retraction instrument is designated 50 in FIG. 4. The retraction instrument is a single piece, two-ended instrument, as shown, and may be formed, for example, of stainless steel or other appropriate material. It may be approximately 6½ inches long. The instrument 50 is designed with two different tips. One tip 52 is called the "mesio-distal" wedge, and it is used for moving the retraction collar 10 away from the prepared tooth mesially and distally. The other tip 54 is called the "buccal-lingual" wedge, and it is used for moving the retraction collar away from the prepared tooth buccally and lingually.

In order to insert the gingival retraction collar 10 around a tooth, for example, the tooth is prepared for the impression in conventional manner, as shown in FIG.

6A, and measured to determine the size of collar to use. However, if it is necessary to extend the preparation subgingivally, it would be more appropriate to wait and perform that part of the preparation after the retraction collar 10 has been inserted, for then the tissue will have been retracted 1 millimeter to 1½ millimeters away from the tooth. The proper size collar 10 is selected, and placed over the tooth, as shown in FIG. 6B, with the tabs 16 extending in the buccal and lingual directions. The tabs 16 may be used for insertion purposes. After insertion of the collar 10, the tabs 16 are folded down, as shown by the solid lines in FIG. 6B, thereby locking the collar around the periphery of the tooth.

If the tissue is not retracted in the buccal and lingual directions as far away from the tooth as it should be, the buccal-lingual wedge 54 of the instrument 50 (FIG. 6C) is used to move the retraction collar away from the tooth in the illustrated manner. If further tooth preparation is required, it can be done at this time. The same operation can be carried out with the mesio-distal wedge 52 (FIG. 6D), at the mesial and distal sides of the collar.

The gingival retraction collar of the present invention has proven to be most satisfactory to the dental profession, in that it saves time in making impressions for crowns, and also provides more detail for the impressions, so that the ultimate crowns have been found to fit better over the teeth.

What is claimed is:
1. A gingival retraction collar comprising:
   a generally rectangular flat body portion formed of a flexible material and having a tooth-receiving aperture therein, the diameter of the aperture approximating the width of said body portion and being less than the length thereof so as to define a single lingual tab at one end of said body portion and a single buccal tab at the other end thereof, and
   a tubular boss-like portion integral with said body portion and surrounding said tooth-receiving aperture to extend subgingivally when the retraction ring is inserted over a tooth between the tooth and the free gingival, said lingual tab and said buccal tab being foldable over said boss-like portion so as to cause said boss-like portion to open a gingival crevice around the tooth when the collar is in place on a tooth of a patient.

2. The gingival retraction collar defined in claim 1 in which said tubular boss-like portion is flared from a relatively large diameter in the plane of said tabs to a relatively smaller diameter at the lower rim thereto.

3. The gingival retraction collar defined in claim 2 in which said lower rimb has an arcuate configuration on the mesial and distal sides thereof, to permit the ring to retract when the aforesaid tabs are folded downwardly so as to open the tooth subgingivally from the free gingivae surrounding the tooth.

References Cited
UNITED STATES PATENTS
3,151,393  10/1964  Holmes _____ 32—17

ROBERT PESHOCK, Primary Examiner